(12) United States Patent
Enerson

(10) Patent No.: US 8,113,654 B2
(45) Date of Patent: Feb. 14, 2012

(54) CONTACT LENS WITH VISUAL INDICATOR

(76) Inventor: Benjamin David Enerson, Winchester, MA (US)

( * ) Notice: Subject to any disclaimer, the term of this patent is extended or adjusted under 35 U.S.C. 154(b) by 244 days.

(21) Appl. No.: 12/684,135

(22) Filed: Jan. 8, 2010

(65) Prior Publication Data

US 2011/0170055 A1    Jul. 14, 2011

(51) Int. Cl.
*G02C 7/04*    (2006.01)
(52) U.S. Cl. .................. 351/160 R; 351/160 H; 351/177
(58) Field of Classification Search ... 351/160 R–160 H, 351/177
See application file for complete search history.

(56) References Cited

U.S. PATENT DOCUMENTS

| | | | |
|---|---|---|---|
| 4,322,139 A * | 3/1982 | Wichterle | .................. 351/160 H |
| 4,616,910 A | 10/1986 | Klein | |
| 5,213,760 A | 5/1993 | Dziabo, Jr. | |
| 6,024,448 A | 2/2000 | Wu | |
| 6,042,230 A | 3/2000 | Neadle | |
| RE37,071 E | 2/2001 | Gabrielian | |
| 6,203,156 B1 | 3/2001 | Wu | |
| 7,213,918 B2 | 5/2007 | Phelan | |
| 2009/0086208 A1 | 4/2009 | Kang | |

FOREIGN PATENT DOCUMENTS

WO    WO/2007/035230    3/2007

OTHER PUBLICATIONS

Kang et al., "Broadwavelength-range chemically tunable block-copolymer photonic gels," Nature Materials, Dec. 2007, 957-60, vol. 6, Nature Publishing Group.

* cited by examiner

*Primary Examiner* — Darryl J Collins

(57) ABSTRACT

A contact lens is provided with an indicator that is visible when placed in contact with a solution, but substantially transparent when removed from that solution. The indicator may be of the type to designate whether the contact lens is to be worn on the right or left eye.

21 Claims, 3 Drawing Sheets

CONTACT LENS WITH VISUAL INDICATOR

FIELD OF INVENTION

The present invention relates to contact lenses, and more specifically, to contact lenses having a visual indicator.

BACKGROUND

Contact lenses have been available for decades, and offer a useful way to improve a user's vision without the encumbrances of eyeglasses. Presently, there are many types of commercially-available contact lenses, including silicon hydrogel contact lenses which are made of a soft, pliable material and have good oxygen permeability. Contact lenses, such as silicon hydrogel contact lenses, may come in a variety of prescription strengths, and may also be used to alter or enhance a user's eye color.

Despite the fact that contact lenses have been available for decades, there are numerous problems with commercially-available contact lenses. First, many people have different prescription strengths for their left and right eyes, respectively. Commercially-available contact lenses do not, however, contain an easy-to-read indicator that identifies which eye a contact lens is to be worn in, or for example, the prescription of the contact lens. Once a contact lens is removed from packaging which designates the eye in which that contact lens should be worn and/or the prescription strength of that contact lens, it may be difficult for a user to thereafter determine into which eye that contact lens should be placed. A common solution to this problem is to provide a contact lens storage case that has an "R" or an "L" label on a well for a right or left eye, for which the right and left contact lenses are to be placed, respectively. However, this solution still suffers from drawbacks. For example, if a user mistakenly places a contact lens into the wrong well of the storage case, it may be difficult to determine into which eye that contact lens should be placed.

Second, soft contact lenses, such as silicon hydrogel contact lenses, are made of soft, pliable material, and therefore may be turned inside out. When a contact lens is turned inside out, and placed on the eye, it may be uncomfortable and result in visual impairment. Often times, when removing a contact lens from its storage case, it becomes difficult to determine if that contact lens is in the correct orientation. Commercially-available contact lenses do not, unfortunately, contain an easy-to-read indicator that identifies whether the contact lens is in the proper orientation for placement on the eye.

There is also a known problem that two or more persons may mix up their contact lenses. For example, if a husband and wife both place their contact lenses in the same storage case (e.g., two contact lenses in a single well) it may be difficult to thereafter determine whether a particular contact lens is the husband's or the wife's.

While it is known to place markings or etchings on contact lenses to distinguish, for example, a lens for the right eye or left eye, such as small dots, commercially-available contact lenses do not contain such markings. This is likely because markings, such as small dots, may be difficult to see on contact lenses, and are therefore unhelpful to the user. It is also likely that commercially-available contact lenses do not incorporate larger markings because they would interfere with the user's vision when the lens is placed in the eye, or may look unsightly.

There is a significant need for a contact lens that incorporates an easy-to-read indicator that is visible under certain conditions, but will not interfere with a user's vision or be noticeable when worn by a user. For example, there is a need for a contact lens that incorporates an indicator, such as one indicating that the contact lens is a "left" or "right" contact lens (e.g., "L" or "R"), or indicating that the contact lens is in the proper orientation (e.g., "UP"), that is visible when in contact with a solution, but once removed from that solution, is not visible and does not interfere with a user's vision when the lens is placed on the eye.

The easy-to-read indicator of the present invention overcomes these problems of the prior art.

SUMMARY

The present invention provides a contact lens having an indicator that is visible when placed in contact with a solution, but is substantially transparent when removed from that solution, as well as a method for manufacturing such a contact lens.

In one embodiment, the contact lens comprises an inner and outer surface with an indicator incorporated with the contact lens body, where the indicator is configured to be visible when in contact with a solution but substantially transparent when removed from the solution. The contact lens may be of any known type, including a silicon hydrogel-type contact lens, and the indicator may comprise a color-changing gel. The indicator may reside on the outer surface of the contact lens and indicate if the contact lens is for the right eye, or for the left eye. The indicator may be configured to be visible in water or a contact lens solution, and substantially transparent or substantially invisible when removed from those solutions.

In another embodiment, a method for manufacturing a contact lens is provided. The method includes forming a contact lens body comprising an inner and outer surface, and incorporating an indicator with the contact lens body, where the indicator is configured to be visible when in contact with a solution but substantially transparent when removed from the solution. The contact lens may be of any known type, including a silicon hydrogel-type contact lens, and the indicator may comprise a color-changing gel. The indicator may reside on the outer surface of the contact lens and indicate if the contact lens is for the right eye, or for the left eye. The indicator may be configured to be visible in water or a contact lens solution, and substantially transparent or substantially invisible when removed from those solutions.

The invention may be implemented to realize one or more of the following advantages. The invention solves the problem in the prior art by providing an easy-to-read indicator that indicates to the user of the contact lenses whether the contact lens is, for example, for the right or left eye, or whether the contact lens is in the proper orientation. The invention solves this problem by providing an indicator that is visible only under certain conditions, for example when the contact lens is in contact with a solution, but is substantially transparent when removed from that solution.

The invention also solves the problems that occur with storing contact lenses in contact lens storage cases. For example, the easy-to-read indicator of the present invention will allow the user to quickly find the contact lens in the storage case. In addition, the easy-to-read indicator may also be used to designate who the owner is of the contact lens e.g. contain the user's name.

Other features and advantages of the invention are apparent from the following description, and from the claims.

BRIEF DESCRIPTION OF THE DRAWINGS

FIG. 1b is a side view of the contact lens shown in FIG. 1a.

DETAILED DESCRIPTION OF PREFERRED EMBODIMENTS

Figure 1A:
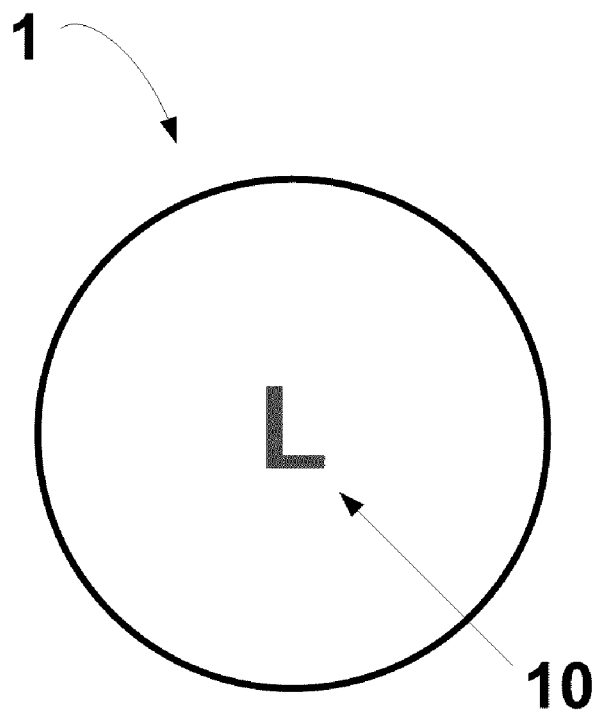
FIG. 1a is a top view of an example of the contact lens of the present invention, when placed in contact with a solution.
Figure 1B:
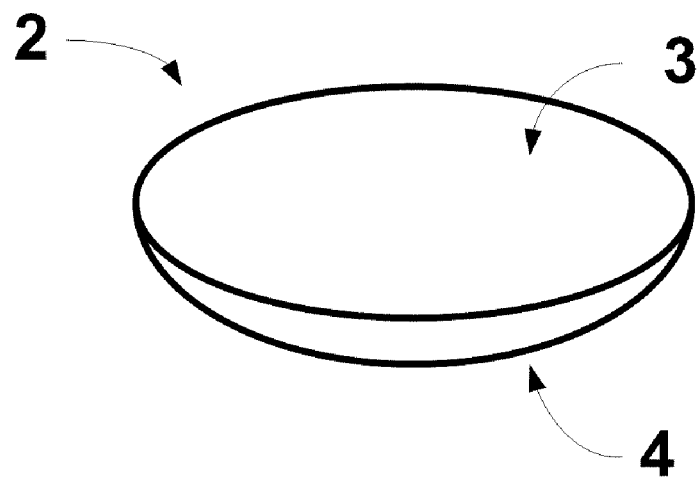

As shown in FIG. 1a, a contact lens 1 incorporates an indicator 10. As shown in FIG. 1b, the contact lens 1 of FIG. 1a has a contact lens body 2 with an inner surface 3 and an outer surface 4. The inner surface 3 is the surface of the contact lens which is placed in contact with the eye. The outer surface 4 is the surface of the contact lens which is not to be placed in contact with the eye. The contact lens 1 of the present invention is not limited to a particular type of contact lens. For example, the contact lens may be a soft contact lens, such as a silicon hydrogel contact lens.

The material of the indicator 10 should be of the type that can be incorporated with the contact lens body 2. The indicator 10 of the present invention may be incorporated with the contact lens body 2 by a number of methods, for example, by manufacturing it with the contact lens body 2, molding or grafting it on a surface 3, 4 of the contact lens, or providing it as one of a number of layers of the contact lens 1. While the present invention is not limited to how the indicator 10 is incorporated with the contact lens body 2, it is preferred that the indicator 10 is placed on the outer surface 4 of the contact lens 1, either before or after any surface treatment of the contact lens 1.

Figure 2:
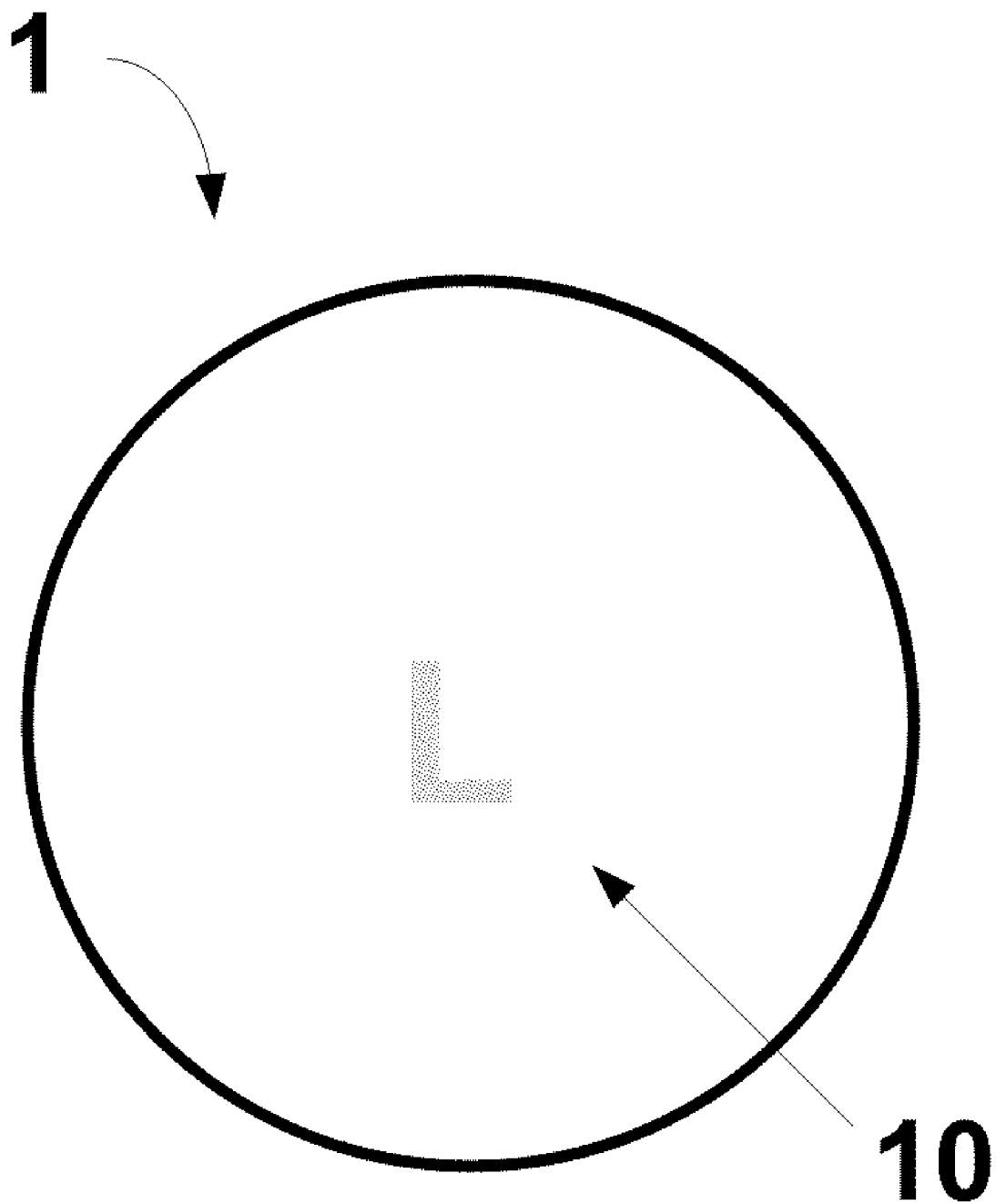
FIG. 2 shows a top view of the contact lens of FIGS. 1a and 1b of the present invention, when removed from the solution.

Referring also to FIG. 2, when in contact with a solution, the indicator may be seen, but when removed from the solution, the indicator 10 becomes substantially transparent. The material of the indicator 10 should therefore be of the type that it is visible when placed in contact with a solution, but substantially transparent when removed from that solution. As used herein, "substantially transparent" means that the indicator 10 allows for the passage of light in the visible spectrum. However, "substantially transparent" does not mean that the indicator 10 becomes completely clear and is indistinguishable from the rest of the contact lens body, although such an indicator would be included within the scope of the present invention. For example, the indicator 10 of the present invention may be visibly red when in contact with a solution, such as water, but appear substantially clear (e.g., colorless) when removed from that solution.

For example, the indicator may be made of a color-changing gel such as the gel described in U.S. Patent App. No. 2009-0086208 (Kang) and Kang et al., "Broad-wavelength-range chemically tunable block-copolymer photonic gels," Nature Materials (Vol. 6, Dec. 2007), the entire disclosures of which are incorporated by reference herein. These references describe a gel material that may be "tuned" to become visible in solution and transparent when removed from that solution. However, it is envisioned that the indicator 10 may also be made of an invisible or disappearing ink that is incorporated with the lens body, e.g. through printing, and that is visible when in contact with a solution, but substantially transparent when removed from that solution.

Preferably, the indicator 10 of the present invention is visible when the contact lens 1 is placed in contact with a commercially-available contact lens solution. In this embodiment, a user will be able to see the indicator 10 when the contact lens 1 is being stored in the contact lens storage case. However, the present invention is not limited to how the contact lens 1 is placed in contact with a solution, or the type of solution that is placed in contact with the contact lens. For example, the user may drop the solution (e.g., saline solution) onto the contact lens surfaces to make the indicator 10 become visible.

Figure 3A:
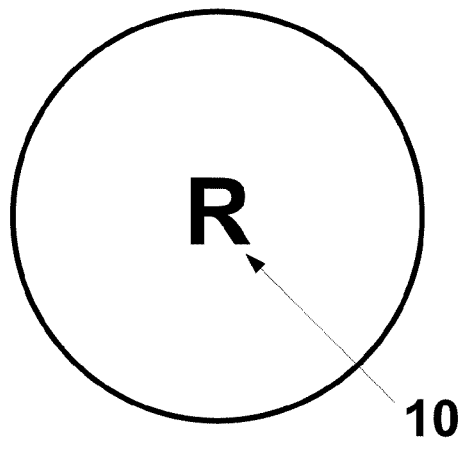
FIGS. 3a-d show various embodiments of the contact lens of the present invention, when place in contact with a solution.
Figure 3B:
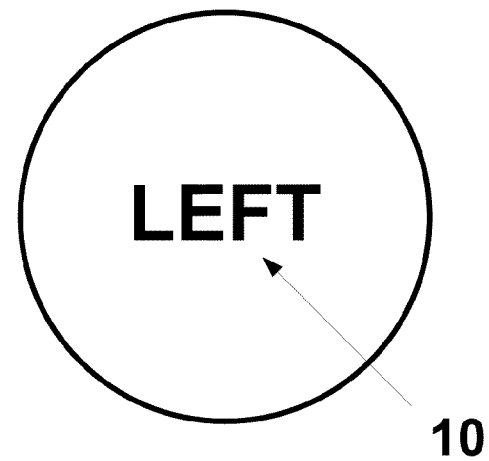
Figure 3C:
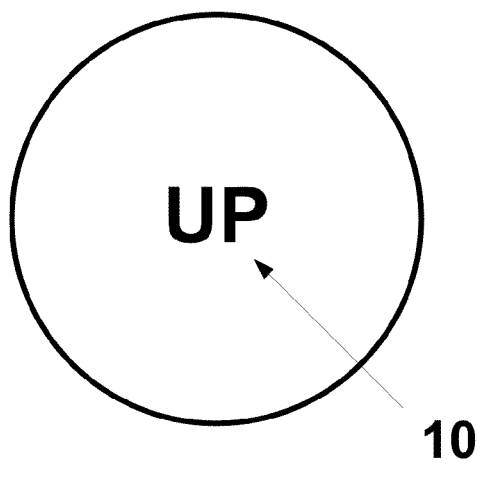
Figure 3D:
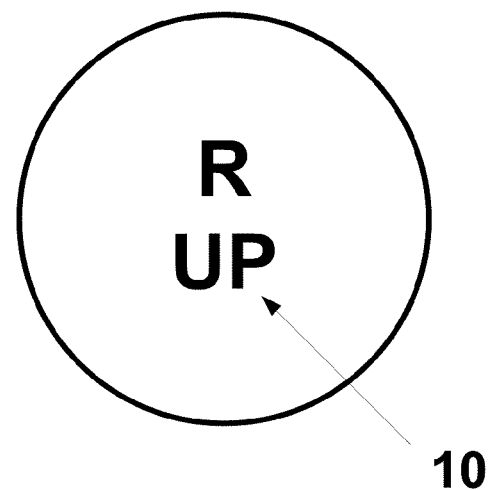

FIGS. 3a-d show different examples of indicators 10 of the present invention, however, the present invention is not limited to a particular type of indicator. FIGS. 3a and 3b, for example, show different types of indicator which designate whether the contact lens is for the right or left eye, respectively. FIG. 3c, on the other hand, shows an indicator which designates whether the contact lens is in the proper orientation by using the word "UP." In this embodiment, it is preferred that when used to indicate orientation, such as using the word "UP," the indicator is placed on the outer surface of the contact lens, so that when the contact lens body is in an inverted cup position (i.e., the outer surface is up), the indicator is readable. Then, if the lens is in the inverted cup position, but not in the correct orientation to be placed in the eye, the "UP" indicator will not be readable. FIG. 3d shows a combination of the indicators described in FIGS. 3a and 3c. The indicator 10 may also be customized for a particular prescription or a particular user. For example, the indicator 10 may contain the prescription strength of the contact lens, or it may contain the name of the user.

It is to be understood that the foregoing description is intended to illustrate and not to limit the scope of the invention, which is defined by the scope of the appended claims. Other embodiments are within the scope of the following claims.

What is claimed is:

1. A contact lens, comprising:
   a contact lens body including an inner and outer surface;
   and an indicator incorporated with the contact lens body, the indicator configured to be visible when in contact with a solution but substantially transparent when removed from the solution.

2. The contact lens of claim 1 wherein the contact lens is a silicon hydrogel-type contact lens.

3. The contact lens of claim 1 wherein the indicator indicates if the contact lens is for a right eye.

4. The contact lens of claim 1 wherein the indicator indicates if the contact lens is for a left eye.

5. The contact lens of claim 1 wherein the indicator comprises a color-changing gel.

6. The contact lens of claim 1 wherein the indicator comprises a disappearing ink.

7. The contact lens of claim 1 wherein the indicator resides on the outer surface of said contact lens body.

8. The contact lens of claim 1 wherein the indicator is configured to be clear when removed from the solution.

9. The contact lens of claim 1 wherein the solution is water.

10. The contact lens of claim 1 wherein the solution is contact lens solution.

11. A method of manufacturing a contact lens, comprising:
    forming a contact lens body including an inner and outer surface;
    incorporating an indicator with the contact lens body, said indicator configured to be visible when in contact with a solution but substantially transparent when removed from the solution.

12. The method of claim 11 wherein the contact lens is a silicon hydrogel-type contact lens.

13. The method of claim 11 wherein the indicator indicates if the contact lens is for a right eye.

14. The method of claim 11 wherein the indicator indicates if the contact lens is for a left eye.

15. The method of claim 11 wherein the indicator comprises a color-changing gel.

16. The contact lens of claim 11 wherein the indicator comprises a disappearing ink.

17. The method of claim 11 wherein the indicator resides on the outer surface of said contact lens body.

18. The method of claim 11 wherein the indicator is configured to be clear when removed from the solution.

19. The method of claim 11 wherein the solution is water.

20. The method of claim 11 wherein the solution is contact lens solution.

21. A contact lens, comprising:
a contact lens body including an inner and outer surface; and a color-changing indicator, wherein the indicator is configured to be visible when in contact with a contact lens storage solution but not visible when worn, and wherein the indicator indicates whether the contact lens is to be worn on either a right or left eye.

* * * * *